No. 891,698. PATENTED JUNE 23, 1908.
C. W. HUNT.
FILLING APPARATUS FOR CONVEYERS.
APPLICATION FILED APR. 3, 1908.

3 SHEETS—SHEET 1.

Attest:
Edgeworth Greene
Ella J. Kruger

Inventor:
Charles Wallace Hunt
by Redding, Greeley & Austin
Att'ys.

No. 891,698. PATENTED JUNE 23, 1908.
C. W. HUNT.
FILLING APPARATUS FOR CONVEYERS.
APPLICATION FILED APR. 3, 1908.

3 SHEETS—SHEET 3.

Attest:

Inventor:
by Charles Wallace Hunt
Redding, Greeley & Austin
Attys.

UNITED STATES PATENT OFFICE.

CHARLES W. HUNT, OF NEW YORK, N. Y.

FILLING APPARATUS FOR CONVEYERS.

No. 891,698.  Specification of Letters Patent.  Patented June 23, 1908.

Application filed April 3, 1908. Serial No. 424,995.

*To all whom it may concern:*

Be it known that I, CHARLES WALLACE HUNT, a citizen of the United States, residing in West New Brighton, in the borough of Richmond, of the city of New York, in the State of New York, have invented certain new and useful Improvements in Filling Apparatus for Conveyers, of which the following is a specification, reference being had to the accompanying drawings, forming a part hereof.

This invention relates to apparatus for filling the buckets of endless conveyers, such as is shown and described in Letters Patent of the United States No. 541,614 dated June 25, 1895. The filler shown in said patent is adapted to receive the material which is to be loaded into the buckets from a chute which discharges the material into the filler from one side and is not adapted to receive the material from a chute which is substantially vertical and is directly over the conveyer. Moreover, the filler shown in said patent cannot be moved away without practically dismembering it at considerable cost in time and labor. It is the object of the present invention to so improve the construction of such fillers as to permit them to receive material from a substantially vertical chute directly over the conveyer, whereby considerable saving in space may be effected, and as to enable the filler to be moved away readily from the chain of conveyer buckets.

The invention will be more fully explained hereinafter with reference to the accompanying drawings in which it is illustrated and in which—

Figure 1:
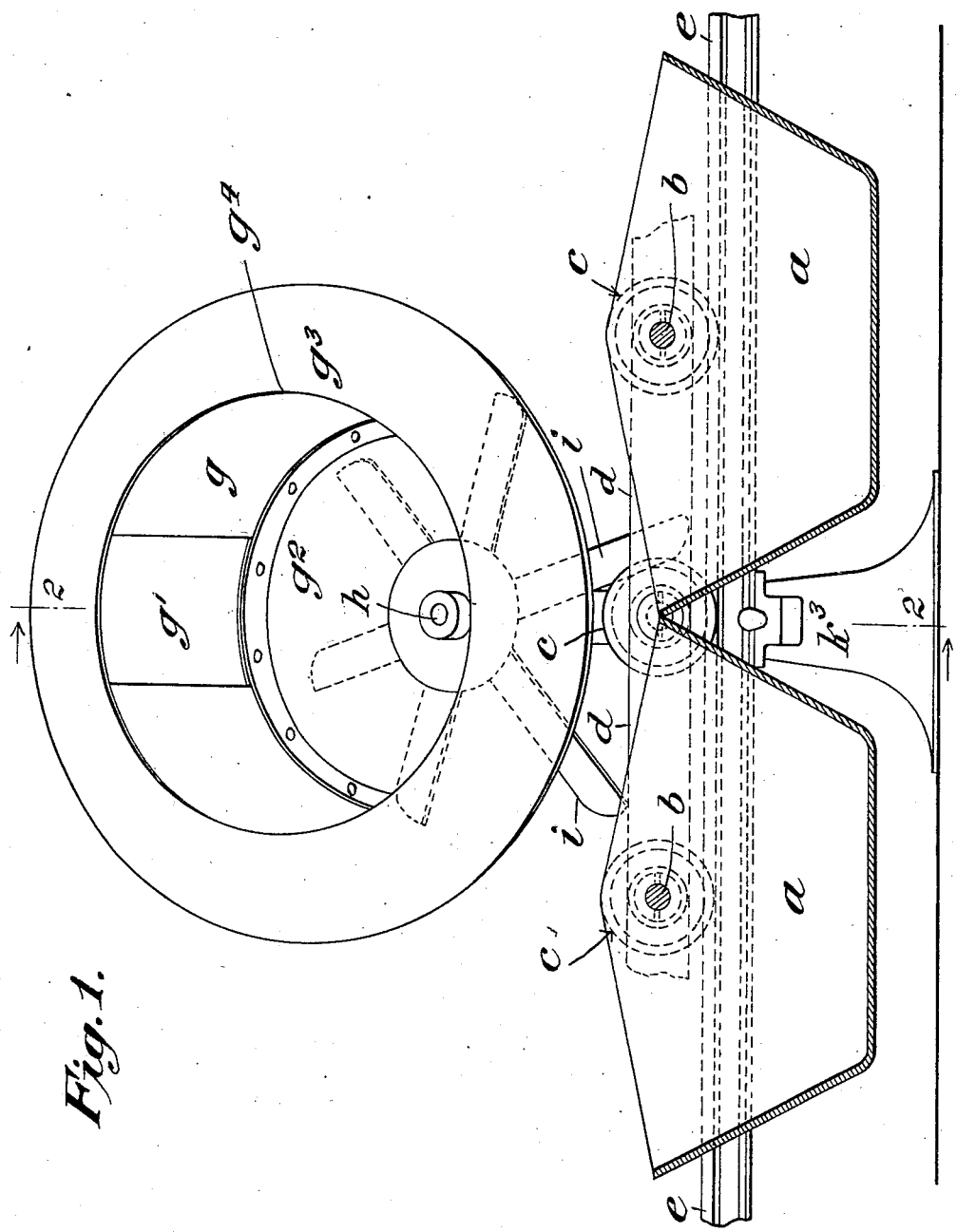
Figure 2:
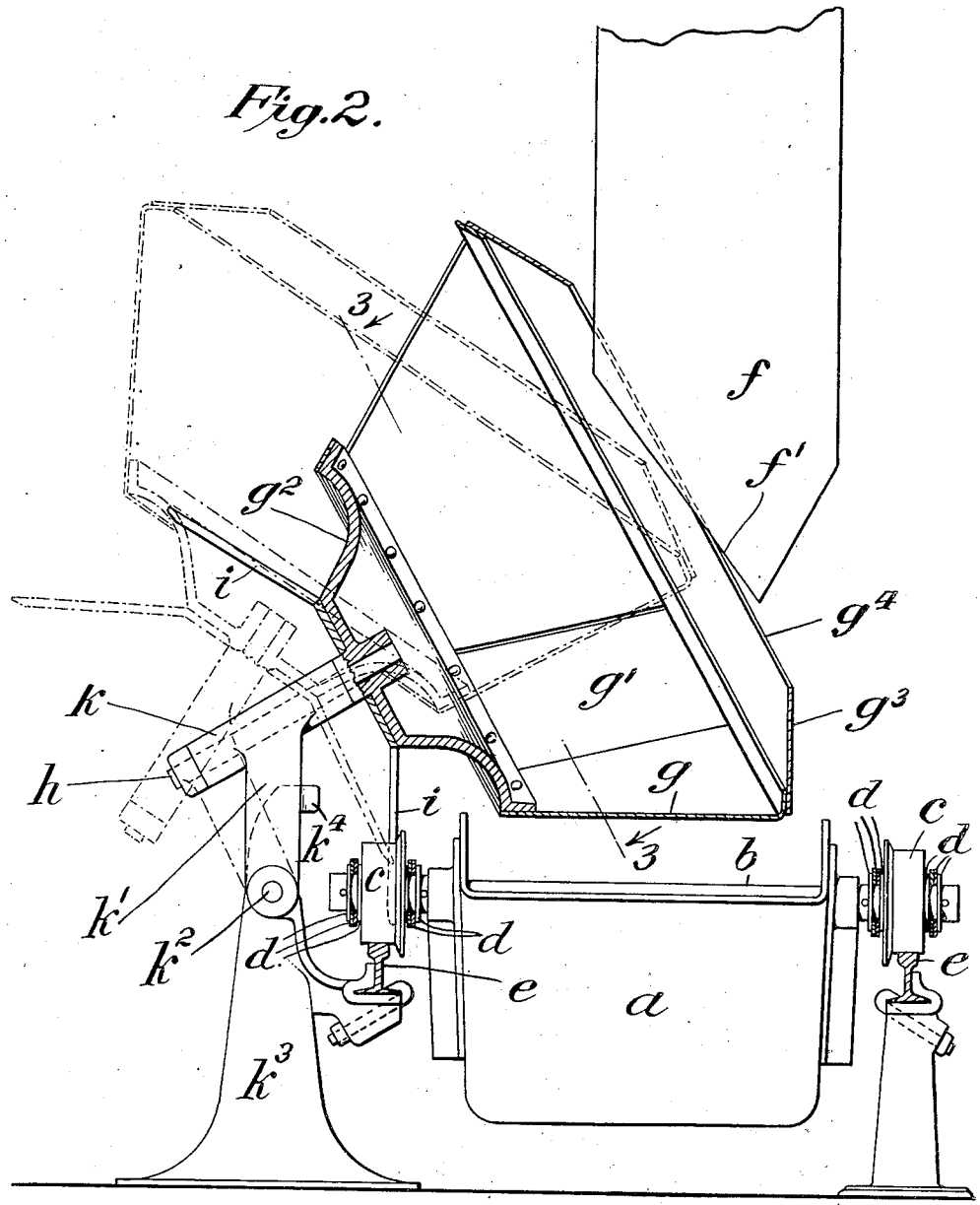
Figure 3:
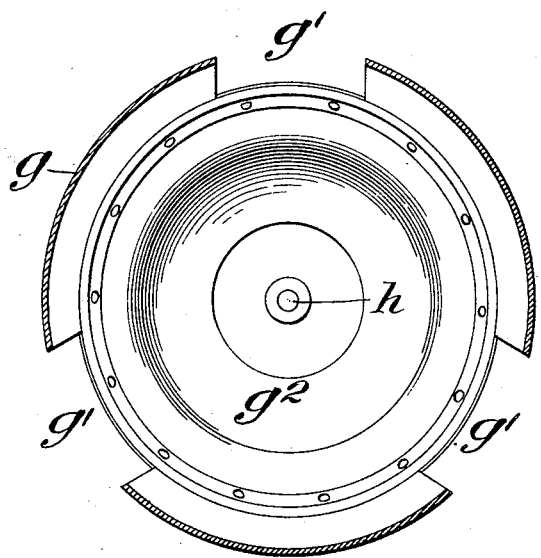

Figure 1 is a view in longitudinal section of a portion of a bucket conveyer with the improved filler in operative position. Fig. 2 is a view in transverse section on the plane indicated by the line 2—2 of Fig. 1, the chute being shown in outline and the position of the filler away from the conveyer being indicated by dotted lines. Fig. 3 is a view in section on the plane indicated by the line 3—3 of Fig. 2.

In the embodiment of the invention illustrated in the drawings there is shown a portion of an endless conveyer chain, composed, as usual, of a series of buckets $a$, transverse shafts $b$, carrying-wheels $c$ and links $d$, the wheels $c$ traveling, as usual, upon rails $e$. A vertical chute $f$, through which the material is delivered, is shown as standing directly over the line of conveyer buckets, and as having an obliquely disposed mouth $f'$.

The filler consists of a frusto-conical shell $g$ which is mounted to rotate upon an inclined axis $h$ so that the lower limb of the shell is substantially horizontal and parallel with the plane of the buckets. The shell $g$ comprises, besides its peripheral wall, which is provided with openings $g'$ disposed at regular intervals, a suitable base $g^2$, which is secured to the supporting shaft $h$, and a guard flange $g^3$, which is inwardly inclined from the rim of the shell, forming an opening $g^4$ through which the material is directed into the shell and preventing the escape of material at the edge of the shell. Secured to the base $g^2$ is a spider $i$, the arms of which are properly disposed so as to be struck by the wheels $c$ on the corresponding side of the conveyer chain, or by some other part of the conveyer or its chain, whereby the shell $g$ is caused to rotate in synchronism with the movement of the conveyer buckets. A bearing $k$ is provided for the shaft $h$ and the normal position of the bearing is such as to support the shell in the position shown by full lines in Fig. 2. The bearing, however, is made movable so as to permit the shell $g$ to be swung back from its operative position out of the way, into position as represented by dotted lines in Fig. 2. For this purpose the bearing $k$ is mounted upon an arm $k'$ which is hinged, as at $k^2$, upon a suitable standard $k^3$. The latter may have a stop $k^4$ to limit the forward movement of the arm $k'$ and therefore hold the shell in proper operative position.

It will now be understood that when the entire apparatus is in operation the material is discharged by the chute $f$ into the rotating shell $g$ and is discharged therefrom, through the lowermost opening $g'$, into the bucket $a$ which is then under the shell. The movements of the bucket and the shell being synchronous, the opening $g'$ travels with the bucket, and the material which escapes through said opening is therefore directed into the bucket. Whenever, for any purpose, it is desired to get the shell out of the way, it is simply swung back upon the hinge joint $k^2$ of the bearing $k$, as represented by dotted lines in Fig. 2.

It will be understood that the form and construction of the shell, as well as of the means for supporting the same, may be varied to suit different conditions of use and that the invention, therefore, is not limited to the precise details of construction and arrangement shown.

I claim as my invention:

1. The combination with a bucket conveyer, of a frusto-conical shell mounted on an inclined axis and having openings in its periphery and in its end, means for rotating the shell in synchronism with the movement of the conveyer buckets, and means for supplying material in a substantially vertical direction into the shell through the opening in its base.

2. The combination with a bucket conveyer, of a frusto-conical shell mounted on an inclined axis and having openings in its periphery and in its end, and an inwardly turned guard flange around the opening in its end, means for rotating the shell in synchronism with the movement of the conveyer buckets, and means for supplying material in a substantially vertical direction into the shell through the opening in its end.

3. The combination with a bucket conveyer, of a frusto-conical shell having peripheral openings, an inturned flange about a central opening in its end and a base plate, an inclined supporting shaft, means for rotating the shell in synchronism with the movement of the conveyer buckets, and means for supplying material in a substantially vertical direction into the shell through the central opening in its end.

4. The combination with a bucket conveyer, of a shell having openings in its periphery and in its end, means for rotating the shell in synchronism with the movement of the conveyer buckets, means for supplying material to the shell through the opening in its end, a supporting shaft for said shell, a bearing for said shaft and a hinged support for said bearing, whereby the shell may be turned back away from the conveyer.

5. The combination with a bucket conveyer, of a frusto-conical shell having openings in its periphery and in its end, means for rotating the shell in synchronism with the movement of the conveyer buckets, means for supplying material in a substantially vertical direction into the shell through the opening in its end, a supporting shaft for said shell, a bearing for said shaft, and a hinged support for said bearing, whereby the shell may be turned back away from the conveyer.

This specification signed and witnessed this first day of April, A. D., 1908.

CHARLES W. HUNT.

Signed in the presence of—
R. B. KELLY,
C. C. KING.